J. B. Sargent,
Hat and Coat Hook.
Nº 70,749. Patented Nov. 12, 1867.
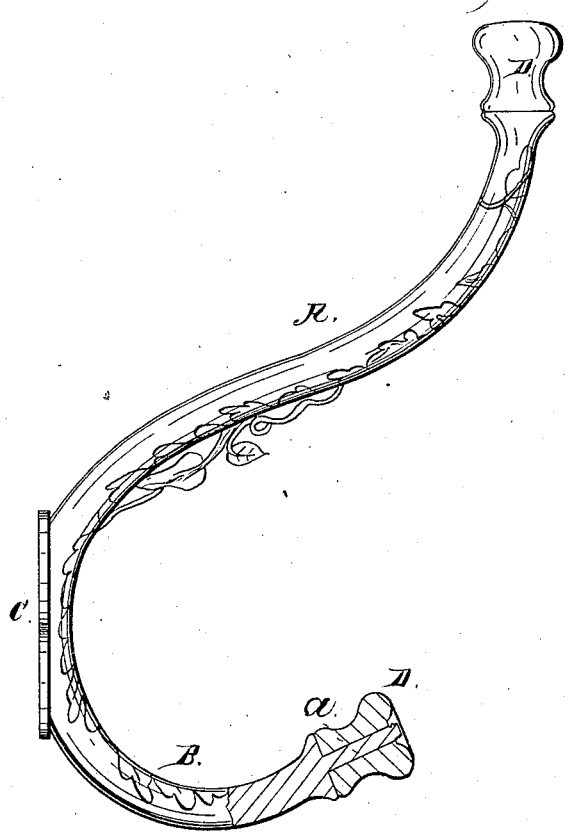
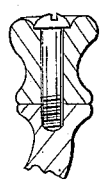
Witnesses:
A. J. Tibbits
John H. Shumway
Inventor,
J. B. Sargent.
By his Attorney,
John E. Earle

United States Patent Office.

J. B. SARGENT, OF NEW HAVEN, CONNECTICUT.

Letters Patent No. 70,749, dated November 12, 1867.

IMPROVED COAT AND HAT-HOOK.

*The Schedule referred to in these Letters Patent and making part of the same.*

TO ALL WHOM IT MAY CONCERN:

Be it known that I, J. B. SARGENT, of New Haven, in the county of New Haven, and State of Connecticut, have invented a new improvement in Coat and Hat-Hooks; and I do hereby declare the following, when taken in connection with the accompanying drawings, and the letters of reference marked thereon, to be a full, clear, and exact description of the same, and which said drawings constitute part of this specification, and represent, in—

Figure 1, a side view, showing the coat-hook in section.

This invention relates to an improvement in that class of coat and hat-hooks which are tipped with a knob of porcelain, or other material than that of which the hook is formed. Heretofore the knob has been secured by "turning" or "spinning" the metal down around and upon the neck of the knob. This affords but slight security, so that this otherwise desirable style of hook is unsalable, inasmuch as the knob or knobs are soon broken or torn from their security. To overcome this objection is the object of my invention, which consists in forming upon the body of the hook or attaching rigidly thereto a spindle, which extends through the knob, and by the said spindle the knob is firmly secured, and cannot be accidentally removed.

To enable others to construct my improvement, I will proceed to describe the same, as illustrated in the accompanying drawings.

A is the coat-hook, B the hat-hook, and C the plate or base by which they are secured to the wall. These may or may not both be formed upon the base C; that is to say, when but one hook is desired, the plate is formed with that attached. D D are the knobs, of porcelain or other suitable material. On the end of the hook, as seen on the hook B, I attach rigidly, or form thereon, a spindle, $a$, which extends through a central perforation in the knob, and upon its upper surface the said spindle is riveted down upon the knob, as denoted in fig. 1, or other security upon the end of the spindle. By this arrangement the knob cannot be detached, and thus is overcome the objection to the coat-hook as heretofore constructed. If preferred, a spindle threaded as in Figure 2 may be inserted through the knob and screwed into the end of the hook, but this construction is not so good as that first described.

It may be proper here to remark the difference between my improvement and what is known as the English hook. That hook is made from tubing bent to the proper form, then a socket prepared to screw on to the end of the tubing, and a spindle passing through the knob is screwed into that socket, thus making in five pieces the knob, whereas in my invention there is practically but one piece beside the knob, thus making a very great saving in expense, and a hook more durable than any heretofore constructed.

I do not therefore wish to be understood as claiming a hook the end of which is finished by the application of a knob of different material; neither do I wish to be understood as claiming broadly the securing of a knob by a rivet or screw passing therethrough; but what I do claim as new and useful, and desire to secure by Letters Patent, is—

A coat and hat-hook, consisting of the plate C and hook or hooks A or B, or both, on which the knob D is secured by a rivet or screw passing therethrough in the manner described.

J. B. SARGENT.

Witnesses:
A. J. TIBBITS,
JOHN H. SHUMWAY.